United States Patent [19]

Nishimura et al.

[11] 3,817,129

[45] June 18, 1974

[54] NUMERICALLY CONTROLLED THREADCUTTING SYSTEM

[75] Inventors: Hideo Nishimura; Kimjo Kanou; Tamotsu Ishigaki; Tetsuo Hosotani, all of Kariya; Sadamu Kato, Takahama, all of Japan

[73] Assignee: Toyoda Koki Kabushiki Kaisha, Aichi-ken, Japan

[22] Filed: Sept. 15, 1972

[21] Appl. No.: 289,566

[30] Foreign Application Priority Data
Sept. 21, 1971   Japan.............................. 46-73631

[52] U.S. Cl. .................................... 82/5, 82/1 C
[51] Int. Cl. ........................... B23b 1/00, B23b 3/00
[58] Field of Search ................................. 82/1 C, 5

[56] References Cited
UNITED STATES PATENTS

| | | | |
|---|---|---|---|
| 3,381,557 | 5/1968 | Dunn | 82/5 |
| 3,595,106 | 7/1971 | Pomella | 82/1 C |
| 3,656,377 | 4/1972 | Kosem | 82/1 C |

*Primary Examiner*—Harrison L. Hinson
*Attorney, Agent, or Firm*—Oblon, Fisher, Spivak, McClelland & Maier

[57] ABSTRACT

A numerically controlled threadcutting system includes a computer, a stepping motor which actuates a cutter along a workpiece, a position coder which generates a series of output pulse signals in accordance with the rotational speed of the workpiece, a shift register and a counter. Interpolated data for threadcutting is memorized in order in the memory of the computer. The interpolation data in the memory is transferred into the shift register one unit by one unit. A unit consists of a predetermined number of binary coded signals. The contents of the shift register are provided to the stepping motor one bit by one bit for controlling the longitudinal movement of the cutter when triggered by the pulse signals from the position coder. When the number of shifts or shift times counter by the counter reaches a predetermined value, the next new unit of the interpolation data in the memory is transferred into the shift register, whereby the transverse movement of the cutter is controlled synchronously with the rotation of the workpiece so as to machine a thread of a predetermined pitch thereon with high accuracy.

5 Claims, 3 Drawing Figures

3,817,129

NUMERICALLY CONTROLLED THREADCUTTING SYSTEM

BACKGROUND OF THE INVENTION

1. Field of the Invention

The present invention relates generally to a threadcutting system and more particularly to an improved system for cutting or forming a thread by computer control.

2. Description of the Prior Art

In general, when a thread is to be machined on a workpiece, the relationship between the rotational angle of the workpiece and the transverse movement of a thread cutting tool must be controlled so as to be kept in a constant ratio in accordance with a predetermined thread pitch. In the prior art, in the case wherein the threadcutting operation was controlled by a computer, the interpolating operation was executed while the threadcutting process was performed. As the computer, a so-called "mini-computer" was usually used. Without exception, however, the machining speed was very slow compared with the operating or data processing speed of the computer. This led to the fact that the number of machine tools in the computer control system was limited to a small number, even if the computer has a great deal of data processing capacity. As a somewhat satisfactory solution to this problem, a specially constructed interpolator was provided for each of the machine tools or machine control circuitry and were controlled by one computer. However, this system was accompanied by some defects such as a high cost of manufacture and complexity in structure.

SUMMARY OF THE INVENTION

Accordingly, it is an object of the present invention to provide a new and improved unique numerically controlled threadcutting system for effectively utilizing the data processing capacity of a computer and controlling a plurality of machine tools by one computer.

Another object of the present invention is the provision of a new and improved unique numerically controlled threadcutting system which is of relatively low cost.

A further object of the present invention is to provide a new and improved unique numerically controlled threadcutting system for machining a thread with fine surface roughness and high accuracy.

The foregoing and other objects are obtained in accordance with one aspect of the present invention through the provision of a numerically controlled threadcutting system which includes a cutter for cutting a thread on a workpiece, a workpiece supporting means for rotatably supporting the workpiece, first driving means for rotating said workpiece, second driving means for effecting a longitudinal relative movement between the workpiece and the cutter, third driving means for effecting a transverse relative movement between the workpiece and the cutter, pulse generating means for generating a series of pulse signals in accordance with the rotational angle of the workpiece, memory means for memorizing the interpolation pulse signals for cutting a thread, and control means having a shift register for receiving a unit of the interpolation pulse signals from the memory means, the unit of interpolation pulse signals in the shift register being serially provided to the first driving means one bit by one bit in synchronization with the pulse signals from the pulse generating means and being shifted one bit by one bit by the pulse signals from the pulse generating means and counter means for sensing a completion operation of the whole data in the shift register and for generating a signal for transferring the next unit of the interpolation pulse signals in the memory means into the shift register, whereby the longitudinal relative movement of the cutter against the workpiece is controlled synchronously with the rotation of the workpiece so as to enable the thread of a predetermined thread pitch to be obtained.

BRIEF DESCRIPTION OF THE DRAWINGS

Various other objects, features and attendant advantages of the present invention will be more fully appreciated as the same becomes better understood from the following detailed description of the preferred embodiment of the present invention when considered in connection with the accompanying drawings in which.

DETAILED DESCRIPTION OF A PREFERRED EMBODIMENT

Figure 1:
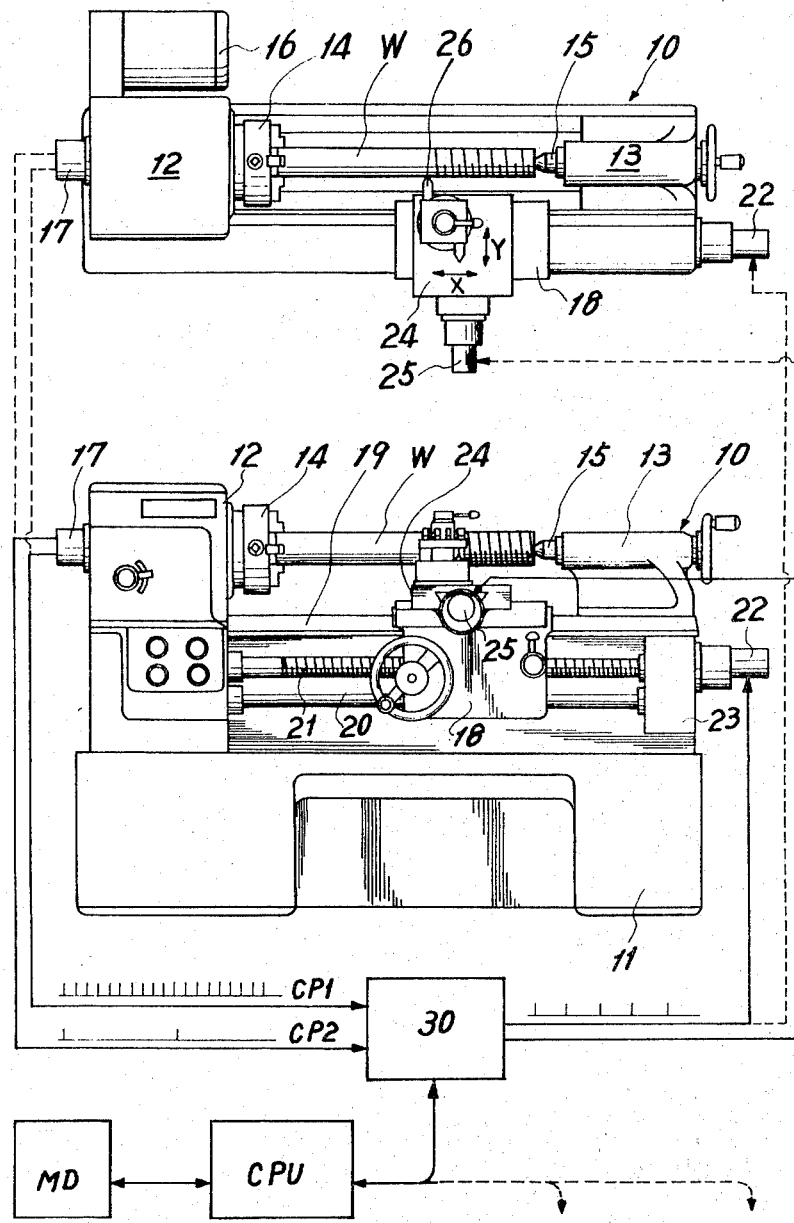
FIG. 1 shows a machine tool together with a schematic block diagram of the threadcutting system of the present invention.

Referring now to the drawings, wherein like reference numerals designate identical or corresponding parts throughout the several views, and more particularly to FIG. 1 thereof wherein a turning machine 10 for enabling a threadcutting operation is shown as having a bed 11 on which a headstock 12 and a tailstock 13 are mounted. A workpiece W is supported by a chuck 14 of the headstock 12 and a center 15 is slidably mounted in the tailstock 13. The workpiece W is rotated by a conventional direct current or alternating current electric motor 16 mounted on the headstock 12 through a headstock spindle (not shown) and the chuck 14. A position coder or a pulse generator 17 is provided on the headstock 12 and is connected with the spindle in the headstock 12. The position coder 17 generates two types of electric pulse signals, namely pulse signals CP1 and CP2 in accordance with the rotational angle of the workpiece W or the headstock spindle. The number of pulse signals CP1 is n per one revolution of the workpiece W or the workhead spindle, whereas the number of pulse signals CP2 is one per one revolution of the workpiece W or the workhead spindle. The pulse signals CP2 are utilized to detect an original angular position of the workpiece W. The position coder or pulse generator 17 may be, for example, of the incremental encoder "INC–25–L" series, produced by Litton Industries, United States of America.

A tool carrier 18 is slidably mounted on a slideway 19 formed on the bed 11 and is also supported by a shaft 20 which is securely mounted on the bed 11 at both ends thereof. The tool carrier 17 is engaged with a feed screw 21 which is rotatably mounted on the bed 11 at each end thereof, and is rotated by a stepping motor 22 mounted on the bed 11 through a transmission mechanism 23 which is designed to reduce the rotational speed thereof in a predetermined reduction ratio. The stepping motor 22 may be any of the conventional electro-hydraulic type.

A cross slide 24 is slidably mounted on the tool carrier 18 and is moved in a transverse direction by a stepping motor 25 which is mounted on the tool carrier 18. A threadcutting tool or cutter 26 is supported on the cross slide 24.

For machining a thread on the workpiece W, the stepping motor 22 must be driven synchronously with the rotation of the electric motor 16 so that the cutter 26 may be longitudinally fed in a predetermined relationship with respect to the rotation of the workpiece W. Thus, the stepping motor 22 must be driven in accordance with the pulse signals which are proportional to the frequency of the pulse signals from the position coder 17.

For example, in the case wherein the longitudinal unit movement X of the tool carrier 18 per one pulse supplied to the stepping motor 22 is 0.01 millimeter (mm) and it is required to get a thread having a thread pitch of 2 mm, then the stepping motor 22 must be driven through 200 pulses per one revolution of the workpiece W. Therefore, where the number $n$ of pulse signals CP1 from the position coder is 1,000, the stepping motor 22 must be driven through one pulse for every fifth pulse from the position coder 17. Generally, for cutting a thread having a thread pitch P, the stepping motor must be driven by one pulse per $x \cdot n/p$ pulses from the position coder 17.

Figure 2:
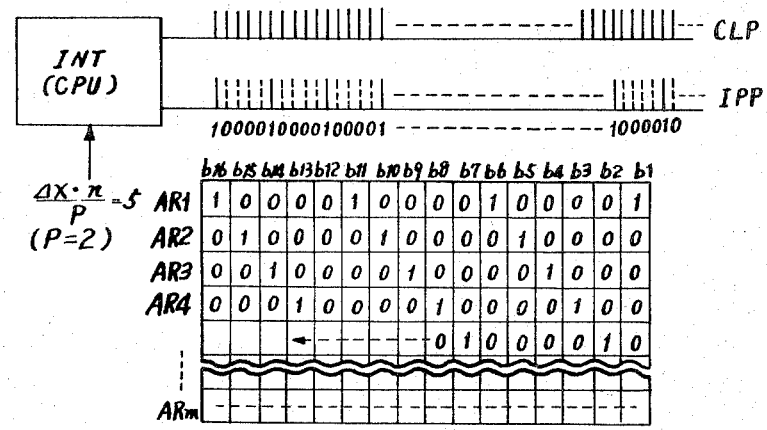
FIG. 2 shows a table of the order of the interpolation pulse signals or data used for threadcutting and memorization in the computer.

For achieving the above mentioned proper pulse distribution, an interpolating operation is performed by a conventional interpolator or a computer CPU in accordance with the thread pitch P, for example, P=2 or the input information $x \cdot n/p$, for example, $x \cdot n/p = 5$, in accordance with the above mentioned assumption, as shown in FIG. 2. In FIG. 2, the conventional interpolator INT generates a series of interpolated pulse signals IPP synchronously with reference clock pulses CLP. Of course, the interpolating operation can be performed by the computer CPU in accordance with a series of programming operations therefor and the input condition P for the interpolation. In the following description it is assumed that the interpolation is performed by the computer CPU. The results of the interpolation for the threadcutting, that is, the interpolation data is memorized in order on the core memory MEM of the computer CPU in the manner shown in FIG. 2. In this particular case the core memory MEM includes addresses AR1 through AR$m$. Each of the addresses is provided with 16 bits $b1$ through $b16$. The interpolation data in one address is hereafter referred to as "one unit of the interpolation data." The interpolating operation and the memorization of the results thereof are performed at a high speed and independently of the actual threadcutting cycle.

Figure 3:
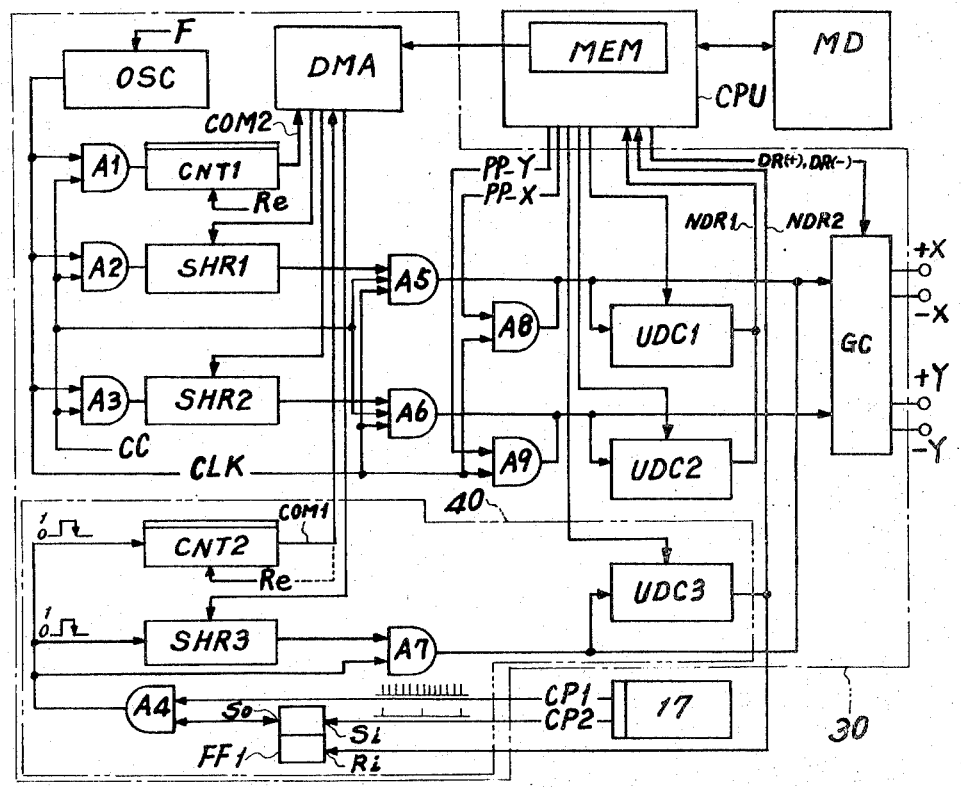
FIG. 3 represents a machine control circuitry according to the present invention.

The interpolation data on the memory MEM are transferred into a shift register in a machine control circuitry 30, shown in FIG. 3, one unit by one unit.

Referring now to FIG. 3, the computer CPU is shown as being connected with the machine control circuitry 30 and other memory means, such as a magnetic disc memory MD or the like, which memorizes programmed instructions of various information for controlling a series of machine tools (not shown) and the other circumferential devices (not shown). The machine control circuitry 30 is constructed by a direct memory access channel DMA, a pulse oscillator OSC, AND gate circuits A1 to A9, two counters CNT1 and CNT2, shift registers SHR1, SHR2 and SHR3 of 16 bits, a flip-flop circuit FF1, presettable up-down counters UDC1, UDC2 and UDC3, and a gate circuit GC.

The direct memory access channel DMA is used for directly transferring information from the memory MEM to the shift registers SHR1, SHR2 and SHR3 without using the data processing capacity of the computer CPU. Therefore, the use of the DMA channel results in an increase in the data processing capacity of the computer CPU and thus, an increase in the number of machine tools and the like controlled thereby. The channel DMA is well known and may be for example, a "Data-Channel" of the "Nova series" computer produced by Data General Corporation, Mass., United States of America, or a "Selector-Channel" provided by International Business Machine Corporation, United States of America.

However, it should be understood that the channel DMA is not necessarily needed for accomplishing the present invention because the data processing capacity of the computer CPU is also available for transferring the interpolation data from the memory MEM to the shift registers SHR1, SHR2 and SHR3.

The pulse oscillator OSC generates clock pulses CLK of a frequency which is controlled by the feed rate signal F supplied from the computer CPU. The oscillator OSC may be a volume-frequency converter such as model "VR–505" produced by Aikoh Denki Co., Ltd., Tokyo, Japan. The AND circuits A1 to A9 are of two or three input type, and when all of the inputs on the respective AND circuits are of a logical value 1, the outputs thereof will become 1. The AND circuits may be of the integrated circuit type "SN7408," produced by Texax Instruments Incorporated, Texas, United States of America.

The shift registers SHR1, SHR2 and SHR3 are of the "Serial input-Parallel output" type and have 16 bits. The contents in the shift register SHR1 and SHR2 are shifted by the shift pulses CLK provided from the oscillator OSC one bit by one bit at the drop down time of each of the shift pulses, that is, at the time when the pulses alter from the logical value 1 to 0. The contents registered on the shift register SHR3 are also shifted one bit by one bit at the drop down time of each of the shift pulses CP1. On the other hand, the output signals of the shift registers SHR1, SHR2 and SHR3 are respectively taken from the right end bit of the registers SHR1, SHR2 and SHR3. Therefore, the contents in the shift registers SHR1 and SHR2 or SHR3 are provided to the AND circuits A5 to A6 or A7 one bit by one bit when the pulse signals CLK or CP1 are applied thereto from AND circuits A2 and A3 or A4.

The shift registers SHR1, SHR2 and SHR3 of 16 bits can be constructed, for example, by connecting two integrated circuits in series of the type "SN 74165" produced by Texas Instruments Incorporated, United States of America.

The counters CNT1 and CNT2 are binary counters and adapted for counting the shift times of the contents in the shift registers SHR1 and SHR2 or SHR3 and detecting the completion of the output of the whole binary data transferred in the shift registers SHR1 and SHR2 or SHR3. The counters can be constructed by connecting five so-called "J-K" flip-flop circuits in series between one of the input terminals thereof and the trigger terminal of another flip-flop circuit. The shift times are counted at the drop down portion from 1 to 0 of the pulse signals CLK or CP1. In consequence, the counters CNT1 and CNT2 respectively generate "Interpolation data request" signals COM2 and COM1 to the channel DMA for enabling a next new unit of interpolation data to be transferred from the memory MEM to the shift registers SHR1, SHR2 and SHR3, when the count of the shift times reaches to 16 which corresponds to the whole interpolation data stored in the shift registers SHR1, SHR2 and SHR3. In addition, it should be understood that conventional ring counters can also be utilized for the counters CNT1 and CNT2.

The presettable up-down counters UDC1, UDC2 and UDC3 are well known, and may be, for example, of the integrated circuit type "SN 71191" or "SN 74192", produced by Texas Instruments Incorporated, United States of America. The counters UDC1, UDC2 and UDC3 are used as preset down or reducing counters. In each of the counters one block of numerical or N/C information is respectively set at a preset value and is reduced by the driving pulses supplied thereto from the AND circuits A5, A6, A7, A8, A9, at the drop down time of the driving pulses. It is to be appreciated that in this particular case one block of N/C information which is set in the shift register SHR3, consists of the information for forming a thread of length L on the workpiece. When the preset values in the counters are reduced to zero, the counters UDC1, UDC2 and UDC3 will generate "N/C Data Request" signals NDR1 and NDR2 for requesting the next block of numerical control data from the computer CPU.

The gate circuit GC is constructed of usual logical circuits such as "AND", "OR" and the like for selecting the rotational direction of the stepping motors 22 and 25. A selection signal DR(+) or DR(−) is supplied from the computer CPU in accordance with the required direction, clockwise or counter-clockwise, to the gate circuit GC.

In the machine control circuitry 30, a threadcutting control circuit 40 is provided. The circuit 40 comprises AND circuits A4 and A7, flip-flop circuit FF1, counter CNT2, shift registers SHR3 and up-down counter UDC3.

The pulse signals CP1 generated by the position coder 17 are supplied to one of the input terminals of the AND circuit A4, and the pulse signals CP2 are supplied to the set input terminal Si of the flip-flop circuit FF1. Furthermore, the "N/C Data Request" signal NDR2 is supplied to the reset input terminal Ri for setting the flip-flop circuit FF1 in the reset condition. It is to be appreciated that the flip-flop circuit FF1 can be initially set in the reset condition by means of a reset signal not shown in FIG. 3.

An output signal generated by the flip-flop circuit FF1 is supplied from the output terminal So thereof to the input terminal of the AND circuit A4. Thus, the pulse signals CP1 can pass through the AND circuit A4 only when the flip-flop circuit FF1 is set in the set condition, that is, when the output signal at the output terminal So is a logical value 1. The output of the AND circuit A4 is supplied to one of the input terminals of the AND circuit A7, a shift terminal of the shift register SHR3 for shifting the contents therein one bit by one bit, and to the counter CNT2 for counting the shift times of the contents in the shift register SHR3. The serial output of the shift register SHR3 is supplied to the other input terminal of the AND circuit A7. The output of the AND circuit A7 applies the driving pulses to the up-down counter UDC3 for subtracting the preset value therein and to the gate circuit GC for driving the stepping motor 22. This output operation is accomplished synchronously with the pulse signals CP1 supplied from the AND circuit A4, that is, when the pulse signals CP1 provided from the AND circuit A4 to the AND circuit A7 are a logical value 1.

For machining a thread having a thread pitch P and a thread length L, the above-noted interpolating operation is performed by the computer CPU in accordance with the information $x \cdot n/p$ or $p$, and the results thereof, that is, the interpolation data are stored in order in the memory as shown in FIG. 2. Moreover, numerical information corresponding to the thread length L is set in the up-down counter UDC3 as a preset value through the computer CPU.

Firstly, one unit of the interpolation data memorized in the address AR1 of the memory MEM is transferred and loaded into the shift register SHR3. On the other hand, the spindle motor 16 is controlled to start to rotate by means of a conventional sequence controller not shown in FIG. 3.

In accordance with the drive of the motor 16, the workpiece W is rotated and at the same time, the position coder begins to generate the pulse signals CP1, the number of which is proportional to the rotational speed of the workpiece W. However, the pulse signals CP1 cannot pass through the AND circuit A4 before the workpiece W is rotated to the original position, because the flip-flop circuit FF1 is initially set in the reset condition and consequently the output from the output terminal So is a logical value 0. When the workpiece W is rotated to the predetermined original position thereof, the position coder 17 generates a pulse signal CP2, which changes the flip-flop circuit FF1 to the set condition at the time when the pulse signal CP2 is changed from 0 to 1. In accordance with the setting of the flip-flop circuit FF1, the output from the output terminal So is changed to the logical value 1, and consequently the pulse signals CP1 pass through the AND circuit A4. This means that the threadcutting operation is started at the predetermined original position of the workpiece W at all times.

When the first pulse of the pulse signals CP1 is applied to the AND circuit A7 and the shift register SHR3, the first signal registered in the shift register SHR3, in this particular case a logical value 1, is applied to the gate circuit GC and the up-down counters UDC3 through the AND circuit A7, since the content in the first bit b1 of the first address AR1 is 1 as shown in FIG. 2. Therefore, the stepping motor 22 is driven by one pulse in a direction predetermined by the computer CPU.

At the moment when the first pulse of the pulse signals CP1 is dropped down from 1 to 0, the content of the shift register SHR3 is shifted in a right direction by one bit and the counter CNT2 counts 1. Moreover, the numerical data preset in the up-down counter UDC3 is reduced by one at the time when the output from the AND circuit A7 is changed from 1 to 0 in accordance with the drop down of the first pulse of the pulse signals CP1.

Thereafter, when the second pulse of the pulse signals CP1 is applied, the shift register SHR3 provides the next new signal through the AND circuit A7 to the gate circuit GC and the up-down counter UDC3. The next new signal, in this particular case, is a logical value 0, since the content of the second bit b2, now shifted into the right end bit of the shift register SHR3 is zero (shown in FIG. 2), whereby the stepping motor 22 is not driven and the contents on the up-down counter are not subtracted by the initiation of the second pulse of the pulse signals CP1.

In this way, pulse signals are provided to the gate circuit GC in accordance with the interpolation data loaded in the shift register SHR3 for driving the stepping motor 22. When the counter CNT2 detects that the shift times have reached 16, that is, when the contents in the shift register have been completely supplied to the gate circuit GC, the counter CNT2 generates the "Interpolation Data Request" signal COM1 to the channel DMA for transferring the next unit of the interpolation data from the address AR2 in the memory MEM to the shift register SHR3. In addition, the count in the counter CNT2 is cleared to zero by the signal COM2. It should be understood that the transferring time of the interpolation data is very short compared with the pulse interval of the pulse signals CP1 in the threadcutting operation. Therefore, the threadcutting operation can continuously proceed. In this manner, the data transfer from memory MEM to the shift register SHR3 and the pulse supply in accordance with the interpolation data in the shift register SHR3 are repeated until the length of the thread reaches to the preset dimension L set in the up-down counter UDC3.

When the preset value in the up-down counter UDC3 is reduced to zero, the counter UDC3 generates the "N/C Data Request" signal NDR2, which is provided to the computer CPU as a program interrupt signal for preparing the next operation on the machine tools and the other means associated therewith in accordance with the predetermined programs. At the same time, the signal NDR2 is also provided to the reset input terminal Ri of the flip-flop circuit FF1. Consequently, the threadcutting operation is stopped because the output at the terminal So of the flip-flop circuit FF1 changes to a logical value 0 and the pulse signals CP1 cannot pass through the AND circuit A4.

In general, a threadcutting operation cannot be accomplished by only one time cutting operation because of the limitation of the cutting depth which is closely related with the accuracy of the thread and the tool breakage. Thus, in order to fully complete a threadcutting operation, several cutting operation times are required in which each time the tool is fed toward the workpiece W by a predetermined incremental amount. In this case, the repeated cutting operations should be at all times started at the original position of the workpiece W by the aid of the pulse signals CP2 as above described.

In the machine control circuitry 30, other control means are provided for accomplishing the satisfactory control on the machine tool 10. One of the control means is a contouring control circuit for continuously and simultaneously controlling the movements of the cutter 26 in the X-axis and the Y-axis directions, and the other is a point-to-point control circuit for controlling the movements of the cutter 26 in the X-axis or the Y-axis direction.

The contouring control circuit comprises the oscillator OSC, AND circuits A1, A2, A3, A5 and A6, shift registers SHR1 and SHR2, counter CNT1, up-down counters UDC1 and UDC2 and gate circuit GC. The shift registers SHR1 and SHR2 respectively receive a unit of interpolation data from the memory MEM which memorizes the interpolation data for the X-axis and the Y-axis directions which is calculated by interpolating operations in a similar manner for the threadcutting control.

In the case wherein the contouring control signal CC is applied from the computer CPU to the AND circuits A1, A2, A3, A5 and A6, the outputs from the shift registers SHR1 and SHR2 are synchronously provided from the AND circuits A5 and A6 to the gate circuit GC and and the up-down counters UDC1 and UDC2 by the clock pulses CLK one bit by one bit because the contents of the shift registers SHR1 and SHR2 are shifted one bit by one bit at the time when the clock pulses CLK applied from the AND circuits A2 and A3 change from 1 to 0. The pulse signal supplied to the gate circuit GC is provided to the stepping motor drive unit (not shown) for performing the required contouring control.

In the contouring control, it should be understood that the counter CNT1 and the up-down counters UDC1 and UDC2 serve as the counter CNT2 and the up-down counter UDC3 in the threadcutting control circuit 40 as well so as to enable a continuous contouring control and an automatically machining stop control.

The point-to-point control circuit comprises the oscillator OSC, the AND circuits A8 and A9, the up-down counters UDC1 and UDC2 and the gate circuit GC. The computer CPU can supply either an X-axis selection signal PP-X or a Y-axis selection signal PP-Y to one of the input terminals of the AND circuit A8 or A9 for enabling the clock pulses CLK to pass through the AND circuit A8 or A9. The numerical information from one block of the numerical control informations is set in the up-down counter selected from the up-down counters UDC1 and UDC2 in accordance with the axis selection signal PP-X or PP-Y, and is reduced by the clock pulses CLK provided from the AND circuit A8 or A9. When the preset value in the up-down counter UDC1 or UDC2 is reduced to zero, the point-to-point control operation is stopped because the counter UDC1 or UDC2 will then generate the "N/C Data Request" signal NDR1 toward the computer CPU and thereby the signal PP-X or PP-Y is cleared. By mean of this point-to-point control circuit, the above-noted infeed movement of the cutter 26 against the workpiece W is performed.

Obviously many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A numerically controlled thread cutting system comprising;

a cutter for cutting a thread on a workpiece;

workpiece supporting means for rotatably supporting said workpiece;

first driving means for rotating said workpiece;

second driving means for effecting a longitudinal relative movement between said workpiece and said cutter;

third driving means for effecting a transverse relative movement between said workpiece and said cutter;

pulse generating means connected to said first driving means for generating first pulses in response to a rotational angle of said workpiece;

memory means having a plurality of addresses respectively including a predetermined number of binary bits, said addresses respectively memorizing a series of interpolation pulse signals for a threadcutting operation by one unit thereof in order; and control means having at least one shift register for receiving said interpolation pulse signals one unit by one unit from said memory means, said unit of interpolation pulse signals in said shift register being provided to said second driving means one bit by one bit in order synchronously with said first pulses, counter means for generating a signal serving to transfer the next unit of said interpolation pulse signals from said memory means into said shift register when said first mentioned unit of interpolation pulse signals in said shift register has been completely provided to said second driving means, and means for controlling a stopping of the threadcutting operation when the thread is formed to a predetermined length on said workpiece.

2. A threadcutting system as in claim 1, wherein said second driving means is a servomotor.

3. A threadcutting system as in claim 2, wherein said pulse generator generates second pulse signals for starting the threadcutting operation at an original and predetermined rotational position of said workpiece.

4. A threadcutting system as in claim 2, wherein said servomotor is a stepping motor.

5. A numerically controlled threadcutting system comprising:

a cutter slidably mounted on a cutter supporting means in a longitudinal and a transverse direction with respect to a workpiece for cutting a thread on a workpiece;

workpiece supporting means mounted on a bed for rotatably supporting said workpiece;

an electric motor mounted on said workpiece supporting means for continuously rotating said workpiece;

a second stepping motor mounted on said cutter supporting means for feeding said cutter in said transverse direction against said workpiece;

pulse generating means mounted on said workpiece supporting means for generating first and second pulse signals in accordance with a rotational angle of said workpiece, said first pulse signals being of a predetermined number of pulses per one revolution of said workpiece and said second pulse signals being generated by one pulse per one revolution of said workpiece;

memory means for memorizing a series of interpolation pulse signals for machining said thread at a predetermined pitch on said workpiece;

control means having at least one shift register for receiving a unit of said interpolation pulse signals from said memory means, said unit of interpolation pulse signals in said shift register being provided one bit by one bit to said first stepping motor for driving the same synchronously with said first pulse signals and being shifted one bit by one bit by said first pulse signals, counter means for sensing an output completion of whole bits of said unit of interpolation pulse signals in said shift register and for generating a signal for serving to transfer a next unit of said interpolation pulse signals in said memory means into said shift register, presettable counter means for controlling to stop a threadcutting operation when the thread is of a predetermined length corresponding to a preset value therein, means for controlling to start said threadcutting operation at an original and predetermined rotational position of said workpiece by means of said second pulse signals supplied from said pulse generating means, and infeed control means for controlling said second stepping motor so as to obtain a predetermined transverse movement of said cutter against said workpiece.

* * * * *